US008161431B2

(12) United States Patent
Buonpane et al.

(10) Patent No.: US 8,161,431 B2
(45) Date of Patent: Apr. 17, 2012

(54) INTEGRATED CIRCUIT PERFORMANCE ENHANCEMENT USING ON-CHIP ADAPTIVE VOLTAGE SCALING

(75) Inventors: Michael S. Buonpane, Easton, PA (US); James D. Chlipala, Emmaus, PA (US); Richard P. Martin, Macungie, PA (US); Richard Muscavage, Gilbertsville, PA (US); Scott A. Segan, Allentown, PA (US)

(73) Assignee: Agere Systems Inc., Allentown, PA (US)

( * ) Notice: Subject to any disclaimer, the term of this patent is extended or adjusted under 35 U.S.C. 154(b) by 601 days.

(21) Appl. No.: 12/261,738

(22) Filed: Oct. 30, 2008

(65) Prior Publication Data

US 2010/0115475 A1    May 6, 2010

(51) Int. Cl.
*G06F 17/50* (2006.01)
*G06F 11/22* (2006.01)
*G06F 11/00* (2006.01)
*G06F 1/26* (2006.01)
*G01K 1/08* (2006.01)

(52) U.S. Cl. ........ 716/100; 716/101; 716/136; 716/138; 374/141; 714/10; 714/22; 713/320

(58) Field of Classification Search .......... 716/100–101, 716/136, 138; 374/141; 714/10, 22; 713/320
See application file for complete search history.

(56) References Cited

U.S. PATENT DOCUMENTS

| | | | | |
|---|---|---|---|---|
| 4,924,112 A * | 5/1990 | Anderson et al. | | 326/32 |
| 5,892,409 A * | 4/1999 | Boerstler | | 331/57 |
| 6,625,785 B2 * | 9/2003 | Chatterjee et al. | | 716/136 |
| 6,694,492 B1 * | 2/2004 | Shakkarwar | | 716/133 |
| 6,823,393 B1 * | 11/2004 | Hericourt | | 709/230 |
| 7,170,810 B1 * | 1/2007 | O et al. | | 365/226 |
| 7,345,948 B2 * | 3/2008 | Oh | | 365/233.12 |
| 7,403,034 B2 * | 7/2008 | Dour et al. | | 326/32 |
| 7,730,434 B2 * | 6/2010 | Aghababazadeh et al. | ... | 716/136 |
| 7,770,139 B2 * | 8/2010 | Arsovski et al. | | 716/111 |
| 7,893,776 B1 * | 2/2011 | Ecker et al. | | 331/44 |
| 2004/0107370 A1 * | 6/2004 | Mosley | | 713/300 |
| 2005/0024035 A1 * | 2/2005 | Tabaian et al. | | 323/315 |
| 2006/0161452 A1 * | 7/2006 | Hess | | 705/1 |

(Continued)

OTHER PUBLICATIONS

S. Das et al., "A Self-Tuning DVS Processor Using Delay-Error Detection and Correction", IEEE J. Solid-State Circuits, vol. 41, No. 4, pp. 792-804, Apr. 2006.

(Continued)

*Primary Examiner* — Stacy Whitmore
(74) *Attorney, Agent, or Firm* — Ryan, Mason & Lewis, LLP (57) ABSTRACT

Techniques for enhancing the performance of an IC are provided. A method of enhancing IC performance includes the steps of: associating at least one performance result of at least one performance monitor, formed on the IC, with deterministic combinations of IC performance and a processing parameter, a supply voltage, and/or a temperature of the IC; determining an IC processing characterization of the IC as a function of the performance result for at least one prescribed supply voltage and temperature of the IC, the IC processing characterization being indicative of a type of processing received by the IC during fabrication of the IC; and controlling a voltage supplied to at least a portion of the IC, the voltage being controlled as a function of the IC processing characterization and/or the temperature of the IC so as to satisfy at least one prescribed performance parameter of the IC.

22 Claims, 4 Drawing Sheets

U.S. PATENT DOCUMENTS

| | | | |
|---|---|---|---|
| 2006/0276917 A1* | 12/2006 | Li et al. | 700/83 |
| 2007/0214377 A1* | 9/2007 | Jarrar et al. | 713/401 |
| 2007/0255972 A1* | 11/2007 | Gaskins et al. | 713/500 |
| 2008/0086706 A1* | 4/2008 | Barrows et al. | 716/5 |
| 2008/0117702 A1* | 5/2008 | Henry et al. | 365/206 |
| 2008/0148197 A1* | 6/2008 | Bickford et al. | 716/3 |
| 2008/0231307 A1* | 9/2008 | Bickford et al. | 324/765 |
| 2009/0007030 A1* | 1/2009 | Nehmadi et al. | 716/4 |
| 2009/0024972 A1* | 1/2009 | Arsovski et al. | 716/5 |
| 2009/0099669 A1* | 4/2009 | Ticknor et al. | 700/83 |
| 2009/0106712 A1* | 4/2009 | Bickford et al. | 716/4 |
| 2009/0177442 A1 | 7/2009 | Martin et al. | |
| 2010/0324750 A1* | 12/2010 | Gaskins et al. | 700/299 |
| 2011/0047523 A1* | 2/2011 | Garcia et al. | 716/122 |

OTHER PUBLICATIONS

D. Blaauw et al., "Razor II: In Situ Error Detection and Correction for PST and SER Tolerance", ISSCC Dig. Tech. Papers, Feb. 2008.

J. Tschanz et al., "Adaptive Frequency and Biasing Techniques for Tolerance to Dynamic Temperature-Voltage Variations and Aging", ISSCC Dig. Tech. Papers, Feb. 2007.

K. A. Bowman et al., "Energy-Efficient and Metastability-Immune Timing-Error Detection and Instruction-Replay-Based Recovery Circuits for Dynamic-Variation Tolerance", ISSCC Dig. Tech. Papers, Feb. 2008.

\* cited by examiner

INTEGRATED CIRCUIT PERFORMANCE ENHANCEMENT USING ON-CHIP ADAPTIVE VOLTAGE SCALING

FIELD OF THE INVENTION

The present invention relates generally to integrated circuits (ICs), and more particularly relates to enhancing the performance of an IC.

BACKGROUND OF THE INVENTION

The use of performance monitors to address certain IC issues, such as, for example, on-chip variation (OCV), speed, and power regulation, is an established technique. Existing performance monitor architectures have included ring oscillators, critical circuit paths, etc., used in conjunction with off-chip voltage regulation. However, difficulties arise in the communication complexity and printed circuit board (PCB) area required for an off-chip voltage regulator. Another challenge is that IC performance monitors, by themselves, disadvantageously produce a result which is a complex combination of processing, voltage supply level, and temperature (PVT) conditions of the IC.

Existing approaches in IC performance monitoring and enhancement typically require intimate knowledge of IC critical paths. For example, some existing approaches require an extensive characterization of the IC (e.g., test chip) performance as a function of supply voltage, temperature, and average supply current (provided by an off-chip voltage regulator). However, knowledge of IC critical paths, or other IC characterization data, is often unavailable, thus creating problems for many conventional approaches. This is particularly true, for instance, when third party intellectual property (IP) is incorporated into an IC, since the third party IP supplier may not be willing to divulge (e.g., for proprietary reasons) the identity of all critical paths and/or an extensive characterization of IP performance as a function of supply voltage, temperature, and average supply current. Additionally, even if vendors did supply this information, the interaction of several third party IP blocks may not be consistent with the characterizations provided by each supplier.

Accordingly, there exists a need for techniques for improving the performance of an IC that do not suffer from one or more of the above-described problems associated with conventional IC performance enhancement methodologies.

SUMMARY OF THE INVENTION

Principles of the present invention provide techniques for beneficially enhancing the performance of an IC using on-chip adaptive voltage scaling. Such performance enhancement may include, for example, improving the operation of the IC (e.g., speed or other timing performance), reducing power consumption in the IC, and/or increasing yield.

In accordance with one aspect of the invention, a method of enhancing IC performance includes the steps of: associating at least one performance result of at least one performance monitor, formed on the IC, with deterministic combinations of IC performance and a processing parameter, a supply voltage, and/or a temperature of the IC; determining an IC processing characterization of the IC as a function of the performance result for at least one prescribed supply voltage and temperature of the IC, the IC processing characterization being indicative of a type of processing used to fabricate the IC; and controlling a voltage supplied to at least a portion of the IC, the voltage being controlled as a function of at least the IC processing characterization so as to satisfy at least one prescribed performance parameter of the IC.

In accordance with another aspect of the invention, an IC includes at least one performance monitor operative to generate at least one performance result. The performance result is associated with deterministic combinations of IC performance and a processing parameter, a supply voltage, and/or a temperature of the IC. A controller functions to receive the performance result from the performance monitor and to generate a control signal indicative of a processing characterization of the IC. The IC further comprises a voltage regulator operative to receive the control signal and to control a voltage supplied to at least a portion of the IC. The voltage is controlled as a function of at least the IC processing characterization so as to satisfy at least one prescribed performance parameter of the IC.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be described herein in the context of exemplary on-chip AVS architectures. It is to be understood, however, that the techniques of the present invention are not limited to the architectures shown and described herein. Rather, embodiments of the invention are broadly directed to techniques for advantageously enhancing IC performance by controlling a voltage supplied to one or more circuit blocks in the IC as a function of IC process characterization, supply voltage and/or temperature measurements, which may be referred to herein as PVT information, obtained from one or more on-chip monitor circuits. Furthermore, although reference may be made herein to particular transistor devices (e.g., metal-oxide-semiconductor field-effect transistors (MOSFETs)) or a specific IC fabrication process (e.g., complementary metal-oxide-semiconductor (CMOS)), it is to be appreciated that the invention is not limited to such devices and/or such an IC fabrication process.

Principles of the present invention include completely on-chip AVS advantageously used for beneficially enhancing the performance of an IC. Such performance enhancement may include, for example, improving the operation of the IC, reducing power consumption in the IC, and/or improving yield. More particularly, one or more embodiments of the invention provide techniques whereby combinations of IC process characterization (e.g., slow, nominal, or fast process), power supply, and/or temperature measurements are used in conjunction with an on-chip, adjustable voltage regulator and an on-chip AVS controller to address certain disadvantages of conventional approaches.

Figure 1:
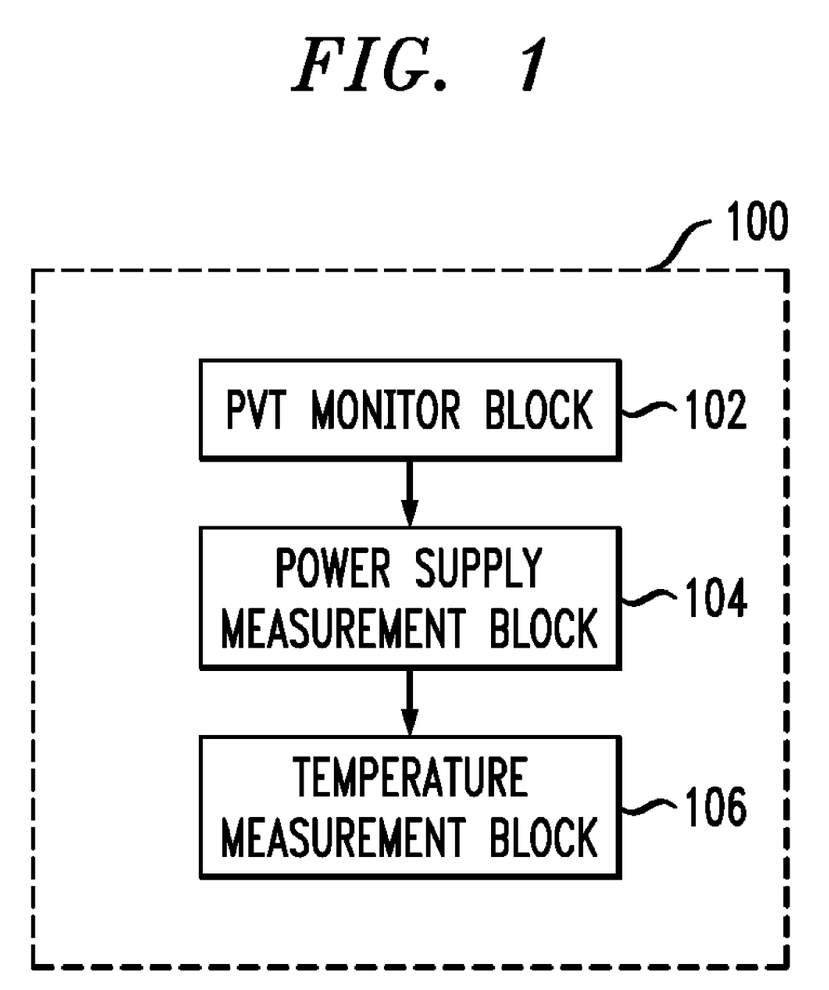
FIG. 1 is a schematic diagram illustrating three types of circuit blocks from which an exemplary performance monitor block can be constructed, according to an embodiment of the present invention.

FIG. 1 is a schematic diagram illustrating three types of circuit blocks from which an exemplary IC performance monitor 100 can be constructed, according to an embodiment of the present invention. The performance monitor blocks can include, for example, some or all of the following: a PVT monitor block 102, a power supply measurement block 104, and a temperature measurement block 106. As will be explained in further detail below, an on-chip voltage regulator and a controller, working in conjunction with one another, preferably adjust the voltage level supplied to one or more circuit blocks in the IC as a function of measurement information from one or more of circuit blocks 102, 104 and 106.

The speed of an IC is traditionally assessed at the so-called "slow corner." This "slow corner" PVT is typically characterized by slow IC processing parameters (P), lowest acceptable power supply voltage (V), and highest allowable temperature (T). For these conditions, an IC will usually exhibit the slowest speed of operation of any PVT parameter combination. Therefore, to insure acceptable IC timing, this slowest speed must be equal to or greater than a prescribed timing specification for the IC. As such, for other PVT combinations, the IC speed will exceed specification, sometimes significantly so. This excess performance, however, is wasted in the sense that it does not contribute to the economic viability of the design. In fact, operating the IC at speeds greater than the prescribed speed results in increased power consumption in the IC, which is undesirable.

The power consumed by an IC may be determined as a combination of the several elements. There is a static element, which is primarily attributable to quiescent current flowing in the IC when the IC is essentially at rest. Additionally, there is a dynamic element which includes CMOS digital circuits that expend power through the charging and discharging of respective capacitive loads in the circuits. This dynamic power element can be calculated, for example, using a well-known power expression, $CV^2F$, wherein C represents capacitance, V represents voltage swing, and F represents frequency of operation.

There is also a leakage element which contributes to overall power consumption in the IC. In CMOS digital circuits, this leakage element may include source-drain leakage and gate leakage. Source-drain leakage can include source-drain current that flows in transistors whose gate-source voltages should have otherwise resulted in a completely quiescent transistor. Gate leakage can include, but is not limited to, quantum tunneling effects that cause current to flow through the parasitic gate oxide capacitor of each MOSFET device, particularly in devices with gate oxide thicknesses less than about 20 angstroms. This gate leakage contribution is strongly dependent on the gate voltage applied to a given MOSFET device.

The highest power consumed by an IC usually occurs for a fast IC process, high supply voltage, and high temperature PVT combination. Fast process generally implies low MOSFET threshold voltage values in the IC, which increases source-drain leakage. High supply voltage increases both source-drain leakage and gate leakage. Additionally, high voltage increases the voltage swing in the $CV^2F$ power expression. High temperature reduces MOSFET threshold voltage which, as noted above, increases source-drain leakage.

If an IC is designed to operate at or above the required speed and at or below the required power for all PVT combinations possible, then its yield will have been maximized from a design standpoint. However, sometimes the desired speed and/or power requirements combined with the available IC processing technology result in a design which meets the speed and/or power specifications only over a subset of PVT conditions. For example, the required speed of operation of an IC may be set so high that only the fast process at high voltage and low temperature PVT condition is acceptable. In such a case, the yield will be negatively impacted because nominal and slow process ICs must be discarded. Alternatively, the power specification might be set so low that only slow process can be provided to the customer. In this case, fast and nominal process ICs must be discarded. These are extreme examples used for illustration purposes only.

In many cases, IC timing and/or power consumption can be controlled by selectively adjusting the voltage supplied to one or more circuit blocks in the IC. As such, in accordance with the teachings herein, one or more embodiments of the invention preferably include on-chip AVS used for IC performance improvement, power reduction, and/or yield enhancement. To accomplish this, an on-chip voltage regulator and a controller are employed to control the voltage supplied to one or more circuit blocks in the IC as a function of measurement information from one or more of the circuit block 102, 104, 106 in the IC performance monitor 100.

With continued reference to FIG. 1, the PVT monitor block 102 preferably generates a result which is a function of PVT conditions in the IC. The power supply measurement block 104 is preferably operative to measure the voltage level (e.g., VDD) supplied to one or more circuit blocks in the IC relative to ground, or an alternative voltage reference (e.g., VSS). Power supply measurement block 104 may accomplish this, for example, by measuring a voltage level of a common voltage supply rail in the IC. Alternatively, a more accurate voltage measurement may be obtained by monitoring the actual localized voltage level supplied to one or more circuit blocks in the IC. Various circuit arrangements operative to measure supply voltage in the IC may be used, including, for example, a simple voltage divider coupled to a comparator circuit (not explicitly shown), although alternative voltage measurement circuitry is similarly contemplated, as will become apparent to those skilled in the art given the teachings herein.

The temperature measurement block 106 is preferably operative to measure a temperature of the IC. Temperature measurement block 106 may accomplish this, for example, by measuring the temperature at a single location on the IC die (e.g., silicon). However, since portions of the IC may run at different localized temperatures, it is preferably for temperature measurement block 106 to monitor the temperature at a plurality of locations on the IC. Various circuits for measuring the temperature of the IC are contemplated, including, for example, a proportional-to-absolute-temperature (PTAT) generator circuit (not explicitly shown), which is operative to generate a voltage or current signal (e.g., based on a device having a known temperature coefficient, such as a bipolar junction transistor) that is indicative of temperature.

Figure 2:
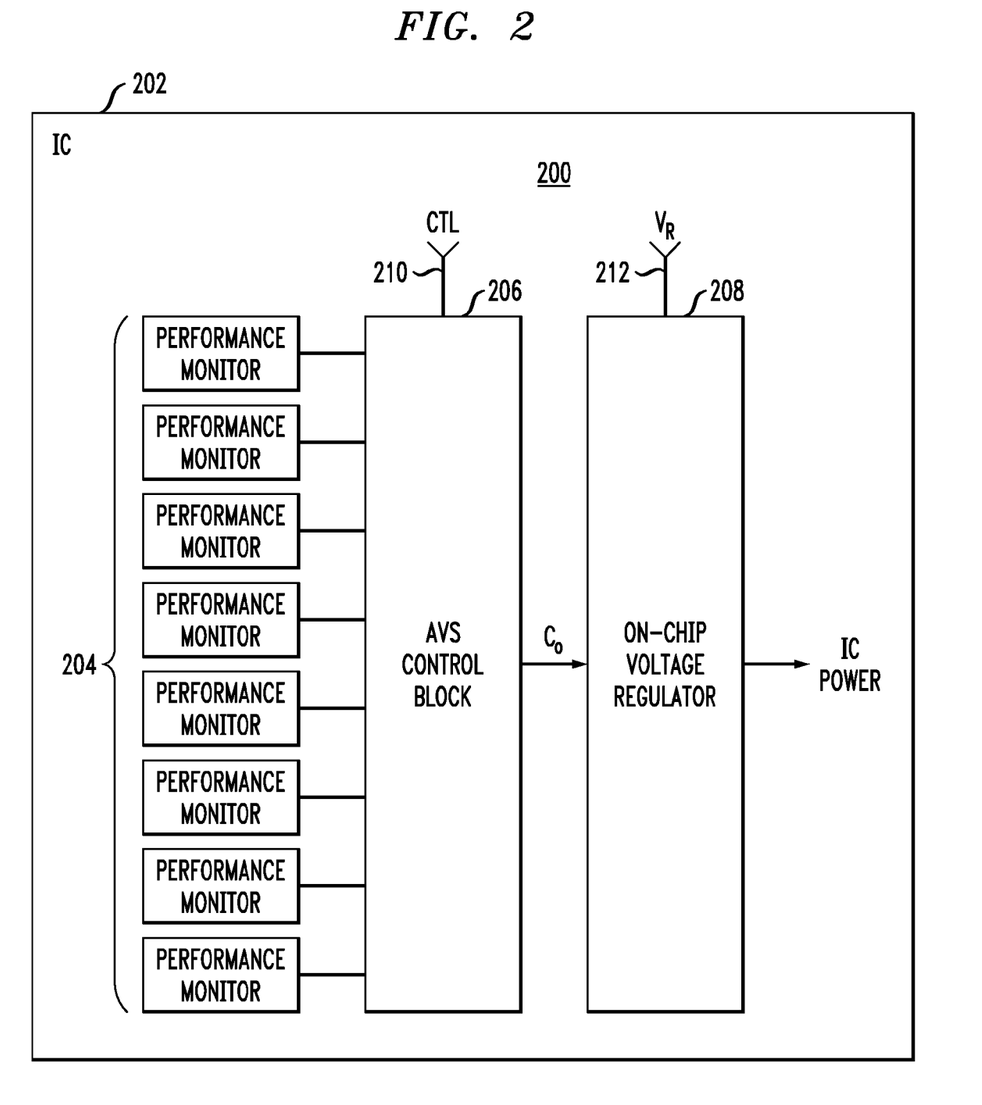
FIG. 2 is a schematic diagram illustrating an exemplary on-chip AVS circuit, including performance monitors, an AVS control block, and a voltage regulator on an IC, according to an embodiment of the present invention.

In addition to the placement of performance monitors on the IC, embodiments of the invention also include an AVS control block, or alternative controller, and an on-chip voltage regulator. With reference now to FIG. 2, a schematic diagram is shown illustrating an exemplary on-chip AVS circuit 200, including a plurality of performance monitors 204, an AVS control block 206, or alternative controller, and a voltage regulator 208, or alternative adjustable (e.g., programmable) voltage source, formed on an IC 202, according to an embodiment of the present invention. As noted above, each performance monitor 204 preferably contains one or more of a PVT monitor block 102, a power supply measurement block 104, and a temperature measurement block 106 (see FIG. 1). It is contemplated that the plurality of performance monitors 204 are placed at prescribed locations throughout the IC, so as to obtain performance information of various regions of the IC. In this manner, on-chip variation (OCV) can be more accurately determined and compensated for accordingly.

The AVS control block 206 preferably includes a plurality of inputs, each input being coupled to a respective one of the performance monitors 204 and adapted to receive an output signal generated by a corresponding one of the performance monitors. AVS control block 206 is preferably operative to initiate one or more activities of the performance monitors 204 coupled thereto, to receive PVT information generated by the performance monitors, to analyze the received PVT information, and to generate at least one output control signal, $C_O$, for controlling the on-chip voltage regulator 208. AVS control block 206 may optionally include at least one additional input 210 adapted to receive an input control signal, CTL. Control signal CTL may be generated externally to the AVS circuit and supplied to input 210 of the AVS control block 206, or control signal CTL may be generated internally by the AVS circuit. The output control signal $C_O$ is preferably a function of the input control signal CTL, when used, and the PVT information received from the plurality of performance monitors 204. An illustrative AVS control block implementation will be described in further detail below with reference to FIG. 3.

The on-chip voltage regulator 208 is preferably operative to receive the output control signal $C_O$ generated by the AVS control block 206 and to generate a prescribed output voltage (IC Power) supplied to one or more circuits on the IC 202. The level of the output voltage generated by the voltage regulator 208 is controlled as a function of the output control signal $C_O$. Voltage regulator 208 may comprise a substantially constant reference voltage source generating a reference voltage, $V_R$, and a regulation element (e.g., a comparator and a feedback control circuit) coupled to the reference voltage source (not explicitly shown). Alternatively, the reference voltage $V_R$ may be generated externally to the voltage regulator 208 and supplied to a reference input 212 of the voltage regulator. In this instance, the reference voltage source may be omitted from the voltage regulator 208. It is also contemplated that the output voltage generated by the voltage regulator 208 may be provided as an output of the IC 202 and used by off-chip circuitry. Voltage regulator circuits suitable for use with the present invention are known by those skilled in the art, and therefore further details of the voltage regulator 208 will not be presented herein.

Figure 3:
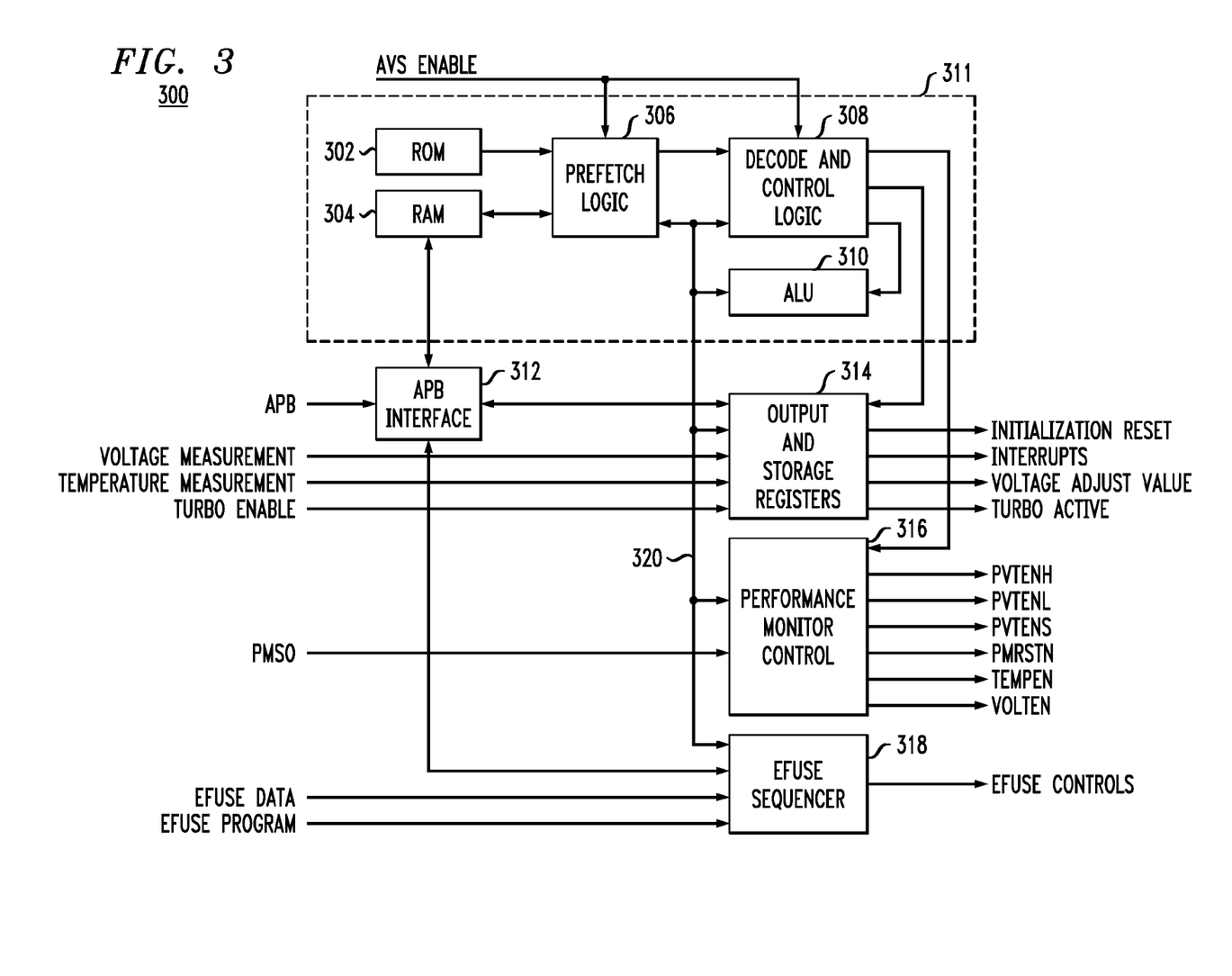
FIG. 3 is a diagram illustrating an exemplary microprocessor-based AVS control block, according to an embodiment of the present invention.

FIG. 3 is a schematic diagram illustrating an exemplary microprocessor-based AVS control circuit 300, according to an embodiment of the present invention. AVS control circuit 300 is an illustrative implementation of at least a portion of the exemplary AVS control block 206 depicted in FIG. 2. By way of example only, and without loss of generality, AVS control block 300 includes a read-only memory (ROM) 302, a random-access memory (RAM) 304, a prefetch logic block 306, a decode and control logic block 308, and an arithmetic logic unit (ALU) 310. An enable signal (AVS Enable) may be supplied to one or more functional block (e.g., prefetech logic block 306 and decode and control logic block 308) to initiate the AVS function in the control circuit 300. ROM 302, RAM 304, prefetch logic block 306, decode and control logic 308 and ALU 310 are preferably connected so as to form a general purpose microprocessor 311, or alternative processing block.

AVS control circuit 300 further includes an advanced peripheral bus (APB) interface 312, or alternative input/output (I/O) interface circuitry, output and storage registers 314, a performance monitor control circuit 316 and an electronic fuse (e-FUSE) sequencer 318. APB interface 312 is preferably adapted to receive an APB signal, or alternative interface signal(s), and to communicate with the output and storage registers block 314 and e-FUSE sequencer 318 to control one or more functional parameters of the AVS control block 300. The output and storage registers block 314, performance monitor control circuit 316, and e-FUSE sequencer 318 are coupled to general purpose microprocessor 311 via a bus 320, or an alternative connection means.

As apparent from the figure, output and storage registers block 314 is preferably adapted to receive voltage and temperature measurement information, which may be obtained, for example, from one or more power supply measurement blocks and one or more temperature measurement circuits (e.g., blocks 104 and 106, respectively, shown in FIG. 1) formed on the IC, and to generate output signals for controlling certain aspects of the higher level AVS circuit (e.g., AVS circuit 200 shown in FIG. 2). Specifically, output and storage registers block 314 is operative to generate a Voltage Adjust Value signal as a function of the received voltage and temperature measurement information. The voltage adjust value signal, which may be analogous to signal $C_O$ depicted in FIG. 2, is employed by the on-chip voltage regulator to control a level of the voltage supplied to the IC.

Output and storage registers block 314 is further operative to generate an initialization reset signal, which preferably functions as a power-on-reset used to turn off one or more circuit blocks in the AVS circuit (e.g., performance monitors and on-chip voltage regulator) while the voltage supply is ramping up to its prescribed operating level. Output and storage registers block 314 may also generate interrupts, used by the AVS circuit or by other circuits on the IC, and a turbo active signal, which is a function of a turbo enable signal received by the output and storage registers block. Output and storage registers block 314, for example, may generate a turbo active output signal as a function of a turbo enable control signal received by the AVS control circuit 300. The turbo active signal is operative to temporarily speed up the performance of the IC when desired, as will be described in further detail herein below.

Performance monitor control circuit 316 is preferably adapted to receive a performance monitor serial output (PMSO) signal. The PMSO signal represents the respective outputs from the plurality of performance monitors (e.g., 204 shown in FIG. 2) sent to the AVS control circuit 300 serially. Alternatively, outputs from the plurality of performance monitors may be sent to the performance monitor control circuit 316 in parallel. The performance monitor control circuit 316 is further operative to control various aspects of the performance monitors. For example, signals PVTENH, PVTENL, and PVTENS, enable high, low, and nominal PVT monitors, respectively. Signal PMRSTN is used to initialize the performance monitors, and signals TEMPEN and VOLTEN are used to enable temperature and voltage measurement, respectively.

AVS control circuit 300 preferably has the ability to interface with an on-chip e-FUSE register. Electronic fuse technology, as is known in the art, allows for the dynamic real-time reprogramming of an IC. Generally speaking, computer logic is typically hard-coded onto a chip and cannot be changed after the chip has been manufactured. By utilizing one or more eFUSEs (an eFuse register generally includes a plurality of eFUSEs), a chip manufacturer can allow for the circuits on a chip, or portions of a circuit, to change during operation of the IC. One application of eFUSE technology is to provide on-chip performance tuning by allowing the chip to change one or more operational parameters by "blowing" (i.e., programming) an eFUSE to thereby open-circuit one or more electrical connections in the IC.

It is to be understood that AVS control circuit 300 is one implementation of the AVS control block 206 depicted in FIG. 2. However, alternative implementations of the AVS control block are similarly contemplated by the invention. For example, in accordance with another embodiment of the invention, at least portions of the AVS control block may be implemented using a state machine, as will become apparent to those skilled in the art.

Figure 4:
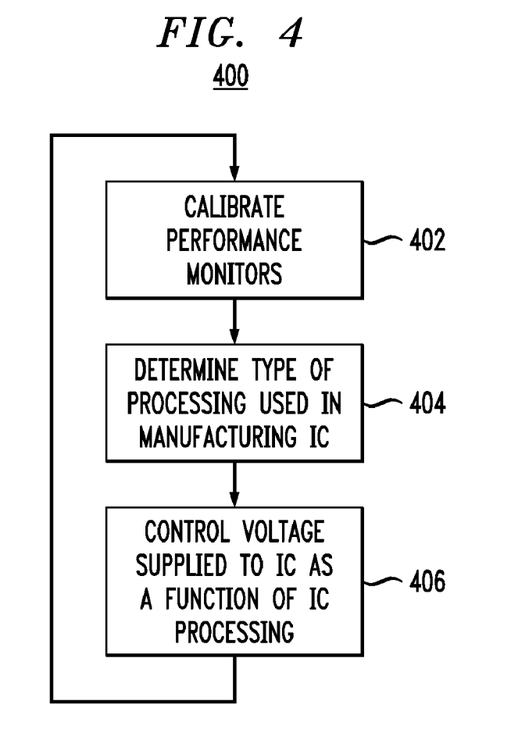
FIG. 4 is a flow diagram illustrating an exemplary method for enhancing IC performance, according to an embodiment of the present invention.

One or more embodiments of the invention additionally include the use of the above-noted on-chip AVS circuit 200 (FIG. 2). FIG. 4 depicts an exemplary method 400 which utilizes on-chip AVS to beneficially enhance the performance of an IC, in accordance with an embodiment of the invention. Preferably, the exemplary method 400 includes calibrating one or more performance monitors on the IC, as shown in step 402. Through a combination of simulation and testing of actual ICs over various PVT conditions, the results produced by the performance monitors will be associated with deterministic combinations of PVT conditions and chip performance.

For example, at least one on-chip performance monitor may comprise a ring oscillator having a frequency response that varies as a function of IC processing, supply voltage, and/or temperature. This so-called "speedometer" performance monitor produces a set of three frequencies of oscillation. Each frequency is measured for a particular ring oscillator fabricated from high, nominal, or low threshold voltage standard CMOS digital circuits, that is, hvt, svt, or lvt, respectively. When calibration of the performance monitors is complete, it will be possible to derive the expected set of three frequency measurements, and therefore the chip performance, given the PVT values (that is, type of processing, power supply value, and temperature). Furthermore, curve fitting can be employed to interpolate between the PVT combinations actually characterized during calibration so as to obtain performance results for any combination of PVT conditions within a prescribed range. Note that the performance monitors of one or more embodiments of the present invention preferably possess the ability to test performance monitors on actual ICs for the power supply and temperature values.

In step 404, the type of processing used to manufacture (i.e., fabricate) a particular IC is determined. In accordance with one aspect of the invention, step 404 may comprise acquiring measurements from the one or more PVT monitor(s), power supply measurement, and temperature measurement blocks in a particular performance monitor. As described herein, the PVT monitor result (result) will be a function of IC processing, supply voltage, and temperature, that is, result=f(P,V,T). Using the results of the calibration from step 402, this equation is solved for P, that is, $$P = \frac{1}{f(\text{result}, V, T)}.$$

This solution may be mathematical, table based, empirical, or some other technique or combination thereof.

Once the IC processing parameter P has been determined in step 404, this value may be substituted back into the equation (result=f(P,V,T)) for the result. In step 406, since P will essentially be constant after IC processing has completed, the voltage (V) supplied to the IC can be controlled as a function of the measured temperature (T) to achieve a desired performance result for the IC. The desired performance result of the IC may include, for example, reduced power consumption, increased speed, and/or increased yield, among other important factors.

The performance level of an IC can degrade with age and use. Phenomena such as, for example, negative bias temperature instability (NBTI), hot carrier degradation/injection (HCI), time dependent dielectric breakdown (TDDB), etc., can cause a steady drop in chip performance. Consequently, because the performance monitors will generally be subject to similar phenomena, steps 402 through 406 in method 400 may be repeated, according to embodiments of the invention, by periodically measuring and analyzing the performance monitors so as to trace the gradual evolution of the circuits toward slower performance. It might appear as though the IC process was migrating toward the slower end of the distribution. The AVS circuit could beneficially compensate for such degradation in IC processing by gradually increasing the level of voltage supplied to the IC in step 406. This can be accomplished, for example, by increasing the on-chip voltage regulator target value to thereby increase the IC voltage supply level and speed up chip performance to adjust for aging effects in the IC.

Aspects of the present invention address design issues that correspond to disadvantages of existing approaches. For example, an IC is typically designed to meet a prescribed speed specification at the slowest case: traditionally slow processing, low voltage supply, and high temperature PVT condition. With AVS techniques in accordance with one or more embodiments of the invention, an acceptable supply voltage range is established. For purposes of illustration and not limitation, assume that the nominal supply voltage is about 0.9 volts (V), and that the supply voltage may go no lower than about 0.81V or no higher than about 0.99V (e.g., 0.9V±10%).

The exemplary AVS circuit (e.g., 200 in FIG. 2) will determine the processing of the silicon IC (as described herein). If the processing is determined to be slow, the AVS circuit will preferably set a relatively higher voltage supply level for the chip (e.g., 0.95V). This will result in a faster slowest design case which satisfies the prescribed speed specification. This situation will consume more power than the traditional slow case, but this case is not indicative of worst case power consumption in any event.

Likewise, if the processing is determined to be fast, the AVS circuit will preferably set a relatively lower voltage supply level for the chip (e.g., 0.81V). This will result in a slower fastest design case, but still fast enough to meet the prescribed speed specification. Also, the lower voltage supply level will reduce the power consumed as compared to the traditional fast case in existing approaches. Further, a result of such techniques will be a design that can meet a faster speed and lower power specification than that obtainable from worst case designs of existing approaches.

Additionally, by controlling the voltage supply levels as a function of the type of processing exhibited by an IC, yield will advantageously improve. For example, ICs with slow processing that otherwise would fail to meet a prescribed speed specification for the traditional slow case, will now meet that specification because of the higher voltage supply level. Also, ICs with fast processing that otherwise would not meet a prescribed power consumption specification for the traditional fast case, will now meet that specification because of the lower voltage supply level.

The AVS circuit may optionally include an override functionality, in accordance with another aspect of the invention. More particularly, an AVS circuit including such an override feature may be operative to enable control of the voltage level supplied to the IC by techniques other than AVS. For example, in one embodiment of the invention, a transparent voltage regulator, a disabled voltage regulator, and/or an explicit setting of the voltage regulator value can be supported. Specifically, with a transparent voltage regulator, the on-chip voltage regulator in the AVS circuit (e.g., 208 in FIG. 2) can be set to a state (i.e., mode) in which a voltage applied to one or more exterior chip pins, normally used by the voltage regulator to produce the lower, regulated supply voltage inside the IC, will instead be presented directly as the internal IC voltage supply itself. With such a technique, the exterior voltage supply level should be reduced to a lower value usable by the IC as its internal voltage Supply.

With a disabled voltage regulator, the voltage regulator can be put into a state in which it has essentially no influence on the internal IC supply voltage. A set of chip package power pins can be provided which will be connected to the internal IC voltage supply network, for example, in a traditional way, as will be understood by those skilled in the art given the teachings herein. During normal AVS operation, these power pins will be unconnected outside the IC package. When the on-chip voltage regulator is disabled, these power pins will be connected to an external voltage source. This voltage source can then provide the internal IC voltage supply in a traditional manner.

With an explicit setting of voltage regulator value, one can control a target voltage level provided by the on-chip voltage regulator. This may be accomplished, for example, via a software update. For a processor-based AVS control circuit, the software can be configured to set the voltage regulator target voltage level to a given value without the explicit intervention of the AVS circuit. This may be an option in the software employed for implementing at least a portion of the AVS circuit, or, alternatively, a completely different program could be loaded into the processor memory. Moreover, the target voltage level could be separately loaded if desired. Alternatively, with reference again to FIG. 3, the voltage regulator target voltage level may be set in a fuse-based manner, such as by blowing one or more e-fuses in an e-fuse register controlled, for example, by e-fuse sequencer 318. In this manner, the normal AVS control mechanism can be disabled and a hard-wired target voltage level for the on-chip voltage regulator can be established. Any of the exemplary techniques described herein can be activated at test time, or alternatively during normal operation of the AVS circuit. The software update, for example, could be activated at any time.

A standard IC testing technique is referred to as Shmoo testing, wherein one or more direct current (DC) parameters of an IC (e.g., voltage supply level) are changed systematically and various IC performance parameters (e.g., timing) are then measured. The result can be displayed graphically to indicate regions in which the IC functions in accordance with prescribed specifications. In the case of an IC including an AVS circuit according to an embodiment of the invention, changing the exterior voltage supply level will not necessarily change the interior voltage supply level, primarily because the on-chip voltage regulator acts as a negative feedback control loop to insure that the voltage supplied to the IC is some specified multiple of a reference voltage. If the exterior voltage supply used by the AVS voltage regulator changes, the regulator will adapt accordingly to maintain a substantially constant internal voltage supply level, which makes traditional Shmoo testing difficult to accomplish. Several techniques, as described herein, can be used to facilitate Shmoo testability in the IC, despite the inclusion of an AVS circuit.

For example, one or more embodiments of the invention may include a transparent on-chip voltage regulator. As mentioned above, the voltage regulator is preferably operative in one of at least two modes, namely, a normal mode in which the AVS circuit controls the on-chip voltage regulator, and a test mode in which the voltage regulator is configured such that the internal voltage supply directly follows an external voltage source. Alternatively, one or more embodiments of the invention may include a disabled voltage regulator, wherein the voltage regulator can be selectively disabled (e.g., via a control signal) and a set of package pins (that are not normally used during AVS operation of the IC) directly connected to the internal voltage supply bus are used to connect to an external voltage supply. Further, one or more embodiments of the present invention may include on-chip software control, wherein a program is loaded into the microprocessor-based AVS control circuit program memory. Such software is preferably operative to cycle through the appropriate voltage supply levels and to communicate these values off-chip to the tester as they were applied. The software could synchronize with the tester to accomplish the Shmoo testing. By way of example, at least one package pin could be connected to the internal voltage supply to allow the tester to monitor the voltage supply level currently being applied by the software. Either of these configurations would provide Shmoo testability.

As described herein, one or more embodiments of the invention can include the capability to temporarily increase the speed of operation of the IC in a first mode of operation, referred to herein as "turbo mode." In a communications switching system application, for example, when a sudden but temporary burst of traffic threatens to cause unacceptable performance degradation in the system, turbo mode could be invoked (e.g., by activating the turbo enable control signal, shown in FIG. 3) until the traffic surge abates. Turbo mode can involve, for example, an increase in system clock speed and/or a decrease in transit times, latencies, and/or propagation delays in digital circuitry in the IC (that is, the IC could support a faster clock). An increase in system clock speed could be handled, for example, by clock generation and distribution circuitry in the IC. Decreasing transit times, latencies, and propagation delays could be accomplished, for example, by an AVS circuit according to the present invention. In this instance, the AVS control block could direct the on-chip voltage regulator to increase the IC voltage supply level by an amount sufficient to increase the speed of the digital circuitry in support of the increased clock rate. Alternatively, a second mode of operation, which may be referred to herein as an "anti-turbo" mode, maybe provided for temporarily decreasing the speed of the IC as a function of at least one performance result generated by the one or more on-chip performance monitors.

One or more embodiments of the invention may also provide a capability analogous to a sleep mode (for example, referred to herein as "anti-turbo"). In such a mode, the clock speed and digital circuit speed would be reduced to save power. This could be accomplished, for example, by following the opposite approach to that described above for implementing the turbo mode.

One or more of the techniques described herein can be applied using architectures which employ off-chip voltage regulation and/or off-chip processing of the IC performance results. For example, calibration of the performance monitors and determination of processing of an IC can be accomplished using the above-mentioned off-chip entities.

It is contemplated that certain regions within a given IC may be configured to have their own local voltage supplies, which may be referred to herein as "voltage islands." This can be done for various reasons, including, but not limited to, the desire to separate sensitive analog circuitry (e.g., voltage references, bias circuits, etc.) from noisy digital circuitry, or the need to run different sections of the IC at different voltage supply levels (e.g., low-voltage core circuitry vs. high-voltage input/output interface circuitry). In accordance with another aspect of the invention, multiple performance monitors in the AVS circuit may support the use of voltage islands. Based on the performance measurements of each monitor, the local region proximate (e.g., surrounding) each performance monitor in the IC could have its own local voltage supply which can be individually controlled to optimize overall performance of the IC. As such, OCV could be addressed in real-time by on-chip components.

As previously stated, instead of monitoring critical path timing, as is often done in conventional approaches, one or more embodiments of the present invention preferably use PVT monitors to assess IC behavior. For example, an established PVT monitor architecture may comprise a ring oscillator. The PVT monitor outputs, voltage supply measurements, and temperature measurements can be correlated with IC performance. This can be done using simulations and/or actual IC measurements, among other methods. For instance, one can employ standard automated test equipment (ATE) using silicon fabricated from enough process variations to allow characterization of IC performance as a function of PVT conditions. Additionally, one can use simulations over sufficient PVT combinations to allow characterization of the IC performance as a function of PVT conditions. A determination of the type of processing that an IC has received, measurement of IC voltage supply level, and measurement of IC temperature allow a direct correlation with simulation results. Simulation results can be parameterized by process, voltage, and temperature, and these measurements can be derived using the AVS circuit according to the teachings herein.

Using the outputs of the PVT monitors, voltage supply monitors, and temperature monitors, the AVS control block can preferably determine the processing which any particular IC has received (e.g., slow, nominal, or fast process). Note, that the IC does not have to be a processor; the techniques described herein can be applied to any IC. Additionally, an AVS circuit according to the present invention can use its knowledge of PVT conditions, as obtained, for example, from the PVT, voltage, and temperature monitors and its determination of the processing level, to beneficially optimize IC performance, power consumption, and yield.

The ability to determine the type of processing received by an IC allows much greater flexibility in tuning the performance and/or power consumption of the IC. For example, using techniques of the present invention, a circuit design relying on knowledge of standard cell propagation delay can now determine this parameter in an absolute sense. Note that the propagation delay through a cell is a function of the processing it has experienced (e.g., slow, nominal, or fast). An example might include a jitter measurement system based on a delay line.

Figure 5:
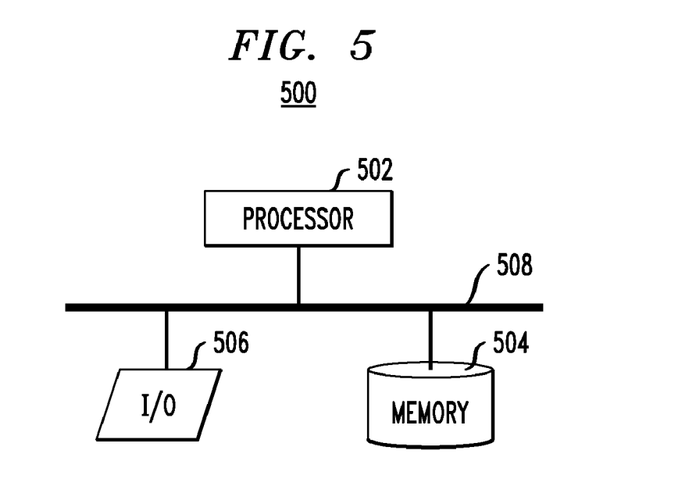
FIG. 5 is a schematic diagram illustrating an exemplary system in which at least a portion of the methodologies of the invention can be implemented, according to an embodiment of the present invention.

One or more embodiments of the invention can make use of software running on a processing system. With reference to FIG. 5, which is a schematic diagram depicting an illustrative processing system 500, such an implementation might employ, for example, a processor 502, a memory 504, and an input/output (I/O) interface 506 which may include, for example, a display and a keyboard (not explicitly shown). The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM, ROM, a fixed memory device (for example, a hard drive), a removable memory device (for example, a diskette), a flash memory and the like. In addition, the phrase "input/output interface" as used herein, is intended to include, for example, one or more mechanisms for inputting data to the processing unit (for example, a mouse), and one or more mechanisms for providing results associated with the processing unit (for example, a display). The processor 502, memory 504, and I/O interface 506 can be interconnected, for example, via bus 508 as part of processing system 500. Suitable interconnections, for example via bus 508, can also be provided to a network interface (not explicitly shown), such as a network card, which can be provided to interface with a computer network, and to a media interface, such as a diskette or CD-ROM drive, which can be provided to interface with media.

Accordingly, computer software including instructions or code for performing at least a portion of the methodologies of the invention, as described herein, may be stored in one or more of the associated memory devices (for example, ROM, fixed or removable memory) and, when ready to be utilized, loaded in part or in whole (for example, into RAM) and executed by a CPU. Such software could include, but is not limited to, firmware, resident software, microcode, and the like.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory (for example memory 504), magnetic tape, a removable computer diskette, a RAM, a ROM, a rigid magnetic disk and an optical disk. Current examples of optical disks include compact disk-read only memory (CD-ROM), compact disk-read/write (CD-R/W) and DVD.

An electronic system, preferably a data processing system, suitable for storing and/or executing program code will include at least one processor 502 coupled directly or indirectly to memory elements 504 through system bus 508. The memory elements can include local memory employed during actual execution of the program code, bulk storage, and cache memories which provide temporary storage of at least some program code in order to reduce the number of times code must be retrieved from bulk storage during execution.

Network adapters such as network interface (not explicitly shown) may also be coupled to the system to enable the data processing system to become coupled to other data processing systems or remote printers or storage devices through intervening private or public networks. Modems, cable modem and Ethernet cards are just a few of the currently available types of network adapters.

In any case, it should be understood that the methodologies illustrated herein may be implemented in various forms of hardware, software, or combinations thereof, for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

At least a portion of the circuits and methodologies of the present invention may be implemented in one or more ICs. In forming ICs, die are typically fabricated in a repeated pattern on a surface of a semiconductor wafer. Each of the die includes a device described herein, and may include other structures or circuits. Individual die are cut or diced from the wafer, then packaged as ICs. One skilled in the art would know how to dice wafers and package die to produce ICs. ICs so manufactured are considered part of this invention.

An IC in accordance with the present invention can be employed in essentially any application and/or electronic system. Suitable systems for implementing techniques of the invention may include, but are not limited to, personal computers, communication networks, electronic instruments (e.g., ATE), interface networks, etc. Systems incorporating such integrated circuits are considered part of this invention. Given the teachings of the invention provided herein, one of ordinary skill in the art will be able to contemplate other implementations and applications of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of enhancing performance of an integrated circuit (IC), the method comprising the steps of:
    generating a plurality of performance results associated with a plurality of corresponding on-chip performance monitors formed at different respective locations on the IC;
    associating at least one of the performance results of at least one of the on-chip performance monitors with deterministic combinations of IC performance and at least one of a processing parameter, a supply voltage, and a temperature of the IC;
    determining an IC processing characterization of the IC as a function of the at least one performance result for at least one prescribed supply voltage and temperature of the IC, the IC processing characterization being indicative of a type of processing used to fabricate the IC; and
    controlling a voltage supplied to at least a portion of the IC, the voltage being controlled as a function of at least the IC processing characterization so as to satisfy at least one prescribed performance parameter of the IC;
    wherein the steps are performed at least in part by a processor.

2. The method of claim 1, wherein the step of associating at least one performance result comprises at least one of simulating and testing a plurality of substantially identical ICs over variations in at least one of a processing parameter, a supply voltage and a temperature of the ICs.

3. The method of claim 1, wherein the step of associating at least one performance result comprises measuring at least one timing parameter of the at least one on-chip performance monitor.

4. The method of claim 3, wherein the at least one timing parameter comprises a frequency response of the at least one on-chip performance monitor.

5. The method of claim 1, wherein the step of determining an IC processing characterization of the IC comprises at least one of acquiring measurements from at least one process, voltage and temperature (PVT) monitor formed in the IC, acquiring a voltage supply measurement of the IC, and acquiring a temperature measurement of the IC.

6. The method of claim 1, further comprising the step of calibrating the at least one performance monitor.

7. The method of claim 1, wherein the step of controlling a voltage supplied to at least a portion of the IC comprises the steps of:
    receiving at least the IC processing characterization;
    measuring at least one of a supply voltage level and a temperature of the IC; and
    adjusting a reference voltage corresponding to an on-chip voltage regulator as a function of the IC processing characterization so as to satisfy the at least one prescribed performance parameter of the IC for at least one of the measured supply voltage level and the measured temperature.

8. The method of claim 7, further comprising setting a target voltage level for the voltage regulator, the voltage regulator maintaining the voltage supplied to at least a portion of the IC substantially at the target voltage level.

9. The method of claim 1, wherein the at least one prescribed performance parameter of the IC comprises at least one of IC timing, power consumption in the IC, and yield.

10. The method of claim 1, further comprising the step of individually controlling a voltage supplied to each of the different respective locations in the IC as a function of the corresponding performance results.

11. The method of claim 1, further comprising the step of individually controlling a plurality of voltage levels supplied to a respective plurality of different locations in the IC as a function of a performance result generated by one on-chip performance monitor.

12. The method of claim 1, further comprising modifying at least one operational parameter of the IC by blowing at least one electronic fuse in the IC.

13. The method of claim 1, wherein the at least one performance monitor comprises at least of a process, voltage and temperature (PVT) monitor, a voltage supply measurement circuit, and a temperature measurement circuit.

14. The method of claim 1, wherein the steps of associating at least one performance result, determining an IC processing characterization of the IC, and controlling a voltage supplied to at least a portion of the IC are repeated so as to satisfy the at least one prescribed performance parameter of the IC over variations in IC processing parameters due at least in part to aging.

15. The method of claim 1, wherein the step of controlling a voltage supplied to at least a portion of the IC is performed during normal operation of the IC.

16. The method of claim 1, further comprising the step of at least temporarily increasing a speed of the IC as a function of the at least one performance result by at least one of increasing a clock speed and decreasing at least one of transit time, latency and propagation delay in the IC.

17. The method of claim 1, wherein the step of generating a plurality of performance results associated with a plurality of corresponding on-chip performance monitors formed at different respective locations on the IC comprises generating the plurality of performance results as a function of at least one of simulation results and measured performance parameters associated with the plurality of corresponding performance monitors.

18. An integrated circuit (IC), comprising:
a plurality of performance monitors formed at different locations throughout the IC, each of the performance monitors generating a performance result which is indicative of at least one of a processing parameter, a supply voltage, and a temperature corresponding to the location in the IC at which the performance monitor is formed, wherein at least one of the performance monitors is operative to generate at least one performance result associated with deterministic combinations of IC performance and the at least one of a processing parameter, a supply voltage, and a temperature of the IC;
at least one controller operative to receive the at least one performance result from the at least one performance monitor and to generate a control signal indicative of at least one of a processing, a supply voltage and a temperature characterization of the IC; and
at least one voltage regulator operative to receive the control signal and to control a voltage supplied to at least a portion of the IC, the voltage being controlled as a function of at least one of the IC processing characterization and the temperature of the IC so as to satisfy at least one prescribed performance parameter of the IC.

19. The integrated circuit of claim 18, wherein the at least one controller is further operative to receive at least the IC processing characterization and to measure at least one of a supply voltage and a temperature of the IC, the control signal generated by the at least one controller being operative to adjust a reference voltage corresponding to the at least one voltage regulator as a function of the IC processing characterization so as to satisfy the at least one prescribed performance parameter of the IC for at least one of the measured supply voltage level and the measured temperature.

20. The integrated circuit of claim 18, wherein the at least one voltage regulator is operative to individually control a plurality of voltage levels supplied to a respective plurality of different locations in the IC as a function of at least one of the IC processing characterization and the temperature of the IC.

21. An electronic system, comprising:
at least one integrated circuit (IC) adapted to perform on-chip adaptive voltage scaling, the at least one IC comprising:

a plurality of performance monitors formed at different locations throughout the IC, each of the performance monitors generating a performance result which is indicative of at least one of a processing parameter, a supply voltage, and a temperature corresponding to the location in the IC at which the performance monitor is formed, wherein at least one of the performance monitors is operative to generate at least one performance result associated with deterministic combinations of IC performance and the at least one of a processing parameter, a supply voltage, and a temperature of the IC;
at least one controller operative to receive the at least one performance result from the at least one performance monitor and to generate a control signal indicative of at least one of a processing, a supply voltage and a temperature characterization of the IC; and
at least one voltage regulator operative to receive the control signal and to control a voltage supplied to at least a portion of the IC, the voltage being controlled as a function of at least one of the IC processing characterization and the temperature of the IC so as to satisfy at least one prescribed performance parameter of the IC.

22. An article of manufacture for enhancing performance of an integrated circuit (IC), the article comprising a non-transitory computer readable storage medium having one or more programs embodied therewith, wherein the one or more programs, when executed by a computer, perform steps of:
generating a plurality of performance results associated with a plurality of corresponding on-chip performance monitors formed at different respective locations on the IC;
associating at least one of the performance results of at least one of the on-chip performance monitors with deterministic combinations of IC performance and at least one of a processing parameter, a supply voltage, and a temperature of the IC;
determining an IC processing characterization of the IC as a function of the at least one performance result for at least one prescribed supply voltage and temperature of the IC, the IC processing characterization being indicative of a type of processing used to fabricate the IC; and
controlling a voltage supplied to at least a portion of the IC, the voltage being controlled as a function of at least the IC processing characterization so as to satisfy at least one prescribed performance parameter of the IC.

* * * * *